(12) United States Patent
Xu et al.

(10) Patent No.: US 12,524,668 B2
(45) Date of Patent: Jan. 13, 2026

(54) DATA-AWARE STORAGE TIERING AND LIFETIME DATA VALUATION FOR DEEP LEARNING

(71) Applicant: HEWLETT PACKARD ENTERPRISE DEVELOPMENT LP, Houston, TX (US)

(72) Inventors: Cong Xu, Milpitas, CA (US); Suparna Bhattacharya, Bangalore (IN); Ryan Beethe, Houston, TX (US); Martin Foltin, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 663 days.

(21) Appl. No.: 17/971,410

(22) Filed: Oct. 21, 2022

(65) Prior Publication Data

US 2024/0135162 A1    Apr. 25, 2024
US 2024/0232607 A9    Jul. 11, 2024

(51) Int. Cl.
G06F 17/00     (2019.01)
G06F 7/00      (2006.01)
G06N 3/08      (2023.01)

(52) U.S. Cl.
CPC .................................... G06N 3/08 (2013.01)

(58) Field of Classification Search
CPC ......................................................... G06N 3/08
USPC ........................................................ 706/912
See application file for complete search history.

(56) References Cited

U.S. PATENT DOCUMENTS

| | | | |
|---|---|---|---|
| 10,387,749 B2 * | 8/2019 | Movshovitz-Attias | G06F 18/217 |
| 10,776,164 B2 | 9/2020 | Zhao et al. | |
| 2022/0374769 A1 * | 11/2022 | Sangroya | G06N 20/00 |
| 2025/0190851 A1 * | 6/2025 | Hilmkil | G06N 3/047 |

OTHER PUBLICATIONS

Shi et al., "A Hierarchical Neural Model of Data Prefetching", Apr. 19, 2021, 2 pages.
Shi et al., "Performance Modeling and Evaluation of Distributed Deep Learning Frameworks on GPUs", IEEE 16th Int. Conf. on Dependable, Autonomic & Secure Comp, 2018, 9 pages.

* cited by examiner

*Primary Examiner* — Pavan Mamillapalli
(74) *Attorney, Agent, or Firm* — Sheppard Mullin Richter & Hampton LLP

(57) ABSTRACT

Systems and methods are configured to provide lifetime data valuations for a dataset that evolves across multiple machine learning training tasks by providing and updating path-dependent data valuations for data points in the dataset during each training task. A current machine learning training task may include splitting the dataset into multiple random mini-epochs and training the current machine learning model using a first random mini-epoch and an accuracy mini-epoch, which consists of high value data points from the path-dependent data valuations. The random and accuracy mini-epochs can be, during the training, iterated for a number of times during the training, while a second random mini-epoch is prefetch. During the training, the path-dependent data valuations can be updated based on data valuations during the current training and a similarity between the current machine learning model and prior trained machine learning models.

20 Claims, 8 Drawing Sheets

DATA-AWARE STORAGE TIERING AND LIFETIME DATA VALUATION FOR DEEP LEARNING

BACKGROUND

Machine learning (ML) models receive an input and generate an output, e.g., a predicted output, based on the received input. These models are based on a collection of states (also referred to as nodes) connected via edges (also referred to as connections). The states are generally aggregated into layers, where different layers perform different transformations on inputs into each layer. Inputs traverse from a first, input layer to a last, output layer, possible traversing through multiple, hidden layers. A state in one layer can be connected to one or more states in a subsequent layer via one or more edges. Each edge typically has a weight assigned thereto, which is adjusted during a learning phase to increase or decrease the probability that a state in one layer transitions to another state in subsequent layer.

ML models are trained with large datasets to learn these weights and to perform a learned tasks. For example, traditionally training a ML model involved inputting data points of a training dataset (e.g., a set of labeled data points) into the various layers and calculating the weights assigned to each edge between the various states of the ML model. The ML models are traditionally retrained on new datasets for a new task. However, quantifying the value of each data point is a fundamental problem in machine learning. ML models are generally improved when trained on large-scale and high-quality datasets. However, collecting such large-scale and high-quality datasets can be costly and challenging. Moreover, there is the additional complexity of determining the samples in a large-scale dataset that are most useful for training and labeling accordingly. Real-world training datasets commonly contain incorrect labels, or the input samples differ in relatedness, sample quality, or usefulness for the target task.

Accurately quantifying the value of data improves model performance for training datasets. Instead of treating all data samples equally, lower priority may be assigned for a datum to obtain a higher-performance model when the value of the datum is low. Typically, quantifying data valuation performance is performed for a single, learned task. That is, conventional data valuation techniques quantify the value of data points for a single ML model performing a single task and provides fixed values for each data point. The data valuations are generally quantifications of the value of data for the trained model and are inapplicable to a subsequent training task whereby a distinct ML model is trained on the same dataset.

BRIEF DESCRIPTION OF THE DRAWINGS

The present disclosure, in accordance with one or more various implementations, is described in detail with reference to the following figures. The figures are provided for purposes of illustration only and merely depict typical or example implementations.

Figure 1:
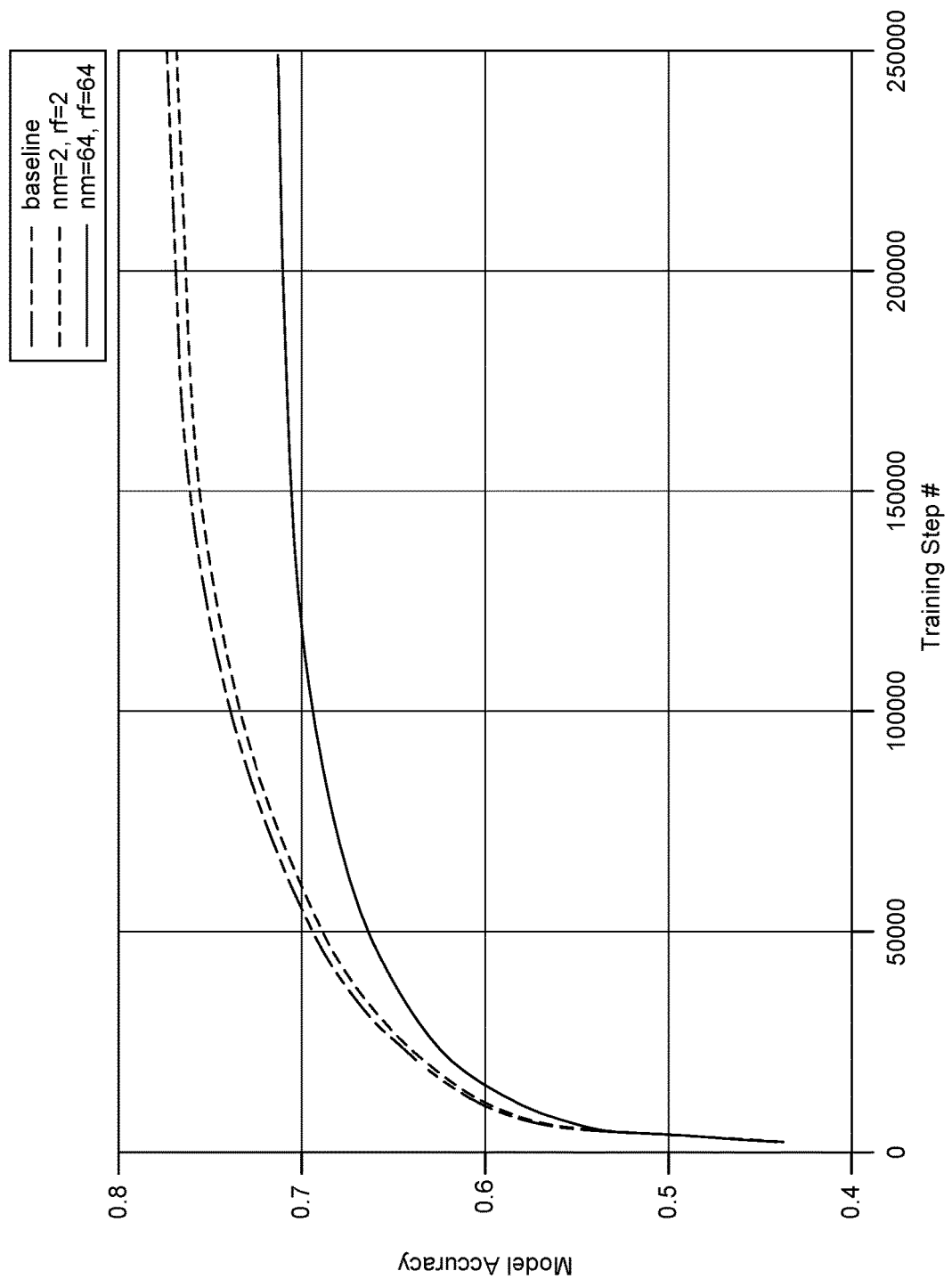
FIG. 1 is a plot of model accuracy as a function of training steps.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described above, conventional data valuation techniques calculate values for data points for a single training task (also referred to herein as a training job) and provides fixed values for the data points. However, the data valuations are generally not applicable for training of a subsequent and distinct ML model because conventual methods generate data values from a single ML training task and fix the data values for other ML training tasks.

Accordingly, example implementations disclosed herein provide for lifetime data valuation that quantifies the value of data points of a dataset across a plurality of ML training tasks, where a training task may refer to training of a single ML model for use in solving a single problem. As used herein, data valuation (or value of data) may be a quantification of the usefulness a datum in training a ML model. Thus, implementations disclosed herein quantify the usefulness of data points for, not only one ML training task, but across multiple training tasks that have used the dataset.

To achieve the above lifetime data valuation, the present disclosure provides path-dependent data valuations for data points in the dataset. As used herein, a "path" refers to a sequence of ML models trained on the dataset. The path-dependent data valuation is written to metadata of the dataset, which includes data valuations assigned to each data point of the dataset and a proxy representative of each ML model trained on the dataset prior to the current training task (if any). In some implementations, each proxy can be provided as a validation vector comprising a representation of validation accuracy of a respective ML model applied to a validation dataset. For each trained ML model, the validation vector is appended to the path-dependent data valuations.

During a current ML training task, data valuations are assigned to each data point in a dataset. The data valuations for each data point may be determined through known data valuation techniques. Path-dependent data valuations can then be updated by applying by applying a step size to the data valuation determined during the training and incrementing the path-dependent data valuations based on the data valuations and the step size. The step size is based on a similarity between the ML model of the current training task and previously trained ML models represented by proxies in the path-dependent data valuations. The similarity between models can be derived using a validation of the current ML model compared to the validations of previously trained ML models. Thus, the values for each data point of the dataset evolve across training tasks over the lifetime of the dataset.

As noted above, ML models trained with very large datasets can perform rich deep learning tasks with high accuracy. However, feeding huge volumes of training data can exert significant pressure on input/output (I/O) subsystems. Generally, training data is loaded in random order from an entire dataset on every training iteration to achieve model convergence. The conventional training does not sufficiently reuse training data that have been loaded for a ML task over multiple iterations but, rather, loads new training data from the entire dataset. Further, the conventional training does not optimally use I/O subsystems that comprises multiple tiers of storage with different read throughput for each tier. For example, the entire dataset can be maintained on a capacity tier that provides large capacity but slow read throughput. When training data is randomly selected from the entire dataset, selected data may not have been cached (or otherwise read into) in a performance tier and cause stalls. Reading the randomly selected training data from the capacity tier instead of the performance tier can significantly impact training efficiency. Thus, improved systems and methods to optimally use multiple-tier storage systems are desired.

Advancements in computational capabilities for training ML models favor larger models trained on increasingly bigger datasets to achieve results with significant improvements in accuracy than was possible before. The datasets are made even bigger with simulated data. In some cases, these datasets can be in the range of terabytes or even petabytes.

Such datasets are, more often than not, too large to be stored on a performance tier storage (e.g., solid state disks (SSDs)) that provides greater bandwidth (e.g., read throughput) than a capacity tier storage (e.g., hard disk drives (HDDs), cloud storage, or the like) that provides greater size but lesser bandwidth. Ideally, an entire dataset should fit on the performance tier to keep powerful artificial intelligence (AI) accelerators (e.g., computing elements, including any number of CPUs, GPUs, or any combination thereof, that are designed to execute training tasks) or other specialized hardware accelerators busy without any downtime. However, various considerations, including cost concerns, cause such ideal scenario impractical. Further, the immense improvements in AI accelerators today resulted in massive I/O bandwidth requirements for the AI accelerators. As an example, training different convolutional neural networks (CNNs) on 8 NVidia A100 GPUs in a single compute node requires up to 130 GB/s of I/O bandwidth to keep the GPUs busy. Thus, the massive I/O bandwidth requirement has become a scalability bottleneck for AI training.

Current training algorithms and related methodologies do not address the scalability bottleneck. For example, a batch stochastic descent training algorithm iterates through an entire dataset in a different random order for every dataset (referred to herein as "epoch"). The algorithm issues requests to I/O subsystems to reload data from a capacity tier to a performance tier for each epoch and causes performance to be limited by bandwidth of the capacity tier, which is far less than the consumption rates of AI accelerators. A study on data stalls in DNN training shows that, when no more than 35% of an entire data set can be cached on a performance tier, 10%-70% of epoch time may be spent blocked on I/O fetch stalls.

Several researchers have explored strategies that are less wasteful of I/O bandwidth. However, effectiveness of optimizations proposed depend not just on system performance characteristics but also on characteristics of the dataset and influence on model convergence. There are systems and methods that intelligently cache data on the performance tier and effectively address any model convergence issues that may arise from the intelligent caching. An example of one such system is described in, for example, U.S. application Ser. No. 17/226,917, the disclosure of which is incorporated herein by reference in its entirety.

In one approach, an epoch is split into a number (i) of first type of mini-epochs each containing 1/i data points of the epoch, which may be a random or pseudo random selection of data points from the epoch. The AI accelerators are iterated over the data for one mini-epoch for a number (j) iterations in a performance tier, while a next mini-epoch is prefetched from a capacity tier and loaded into the performance tier. While the prior methods mitigated I/O fetch stalls and reduced training time, for example, up to 75%, the prior methods exhibited drawbacks in model convergence when the number of mini-epochs and/or the number of iterations exceeded a certain number, for example, 32 in some applications. For example, data in a given mini-epoch is likely to have more bias than data in the entire epoch. Thus, repeated use of a given mini-epoch may introduce some bias during training. Further, the repeated use can overfit a ML model to the given mini-epoch. Introduction of bias and/or overfitting can lead to reduce accuracy in the training. For example, the accuracy of the training may drop between 1% to up to 10%. FIG. 1 is a plot 100 illustrating reduced model accuracy during training as a function of training steps. Training steps refers to a number of data points over which the ML model has been trained. As shown in FIG. 1, when the number of mini-epochs and the number of iterations is set to 2, the trained model converges with the baseline. However, when the number of mini-epochs and/or the number of iterations is increased to 64, the trained model deviates almost 10% from the baseline.

Accordingly, implementations of the present disclosure provide for a second type of mini-epoch that includes data points based on the lifetime data valuation of the epoch, which can increase accuracy of the training. For example, the second type of mini-epoch is created having a number of data points of the epoch having the highest data valuations assigned thereto. The AI accelerators are iterated over the data for a combination of the second type of mini-epoch and one of the first type of mini-epoch for a number (i) iterations, thereby influencing model convergence by reducing bias in the first type of mini-epoch and ensuring the model does not overfit to the first type of mini-epoch through consistent inclusion of high valued data.

Accordingly, the technology disclosed herein can reduce stalls caused by I/O bandwidth without sacrificing model convergence and accuracy across numerous training tasks. Based on computer technologies, the disclosed technology can provide for co-optimizing the data tiering and iteration scheme for ML training with a systematic approach that is (1) bandwidth aware, (2) model convergence conscious, and (3) data sample influence aware. The disclosed technology can effectively address threefold challenges of (1) providing sustained read throughput for AI accelerators that matches the required I/O bandwidth; (2) introducing the disclosed technology with minimal disruption to current ML pipelines; and (3) providing lifetime data valuations to facilitate cross ML training tasks.

Figure 2:
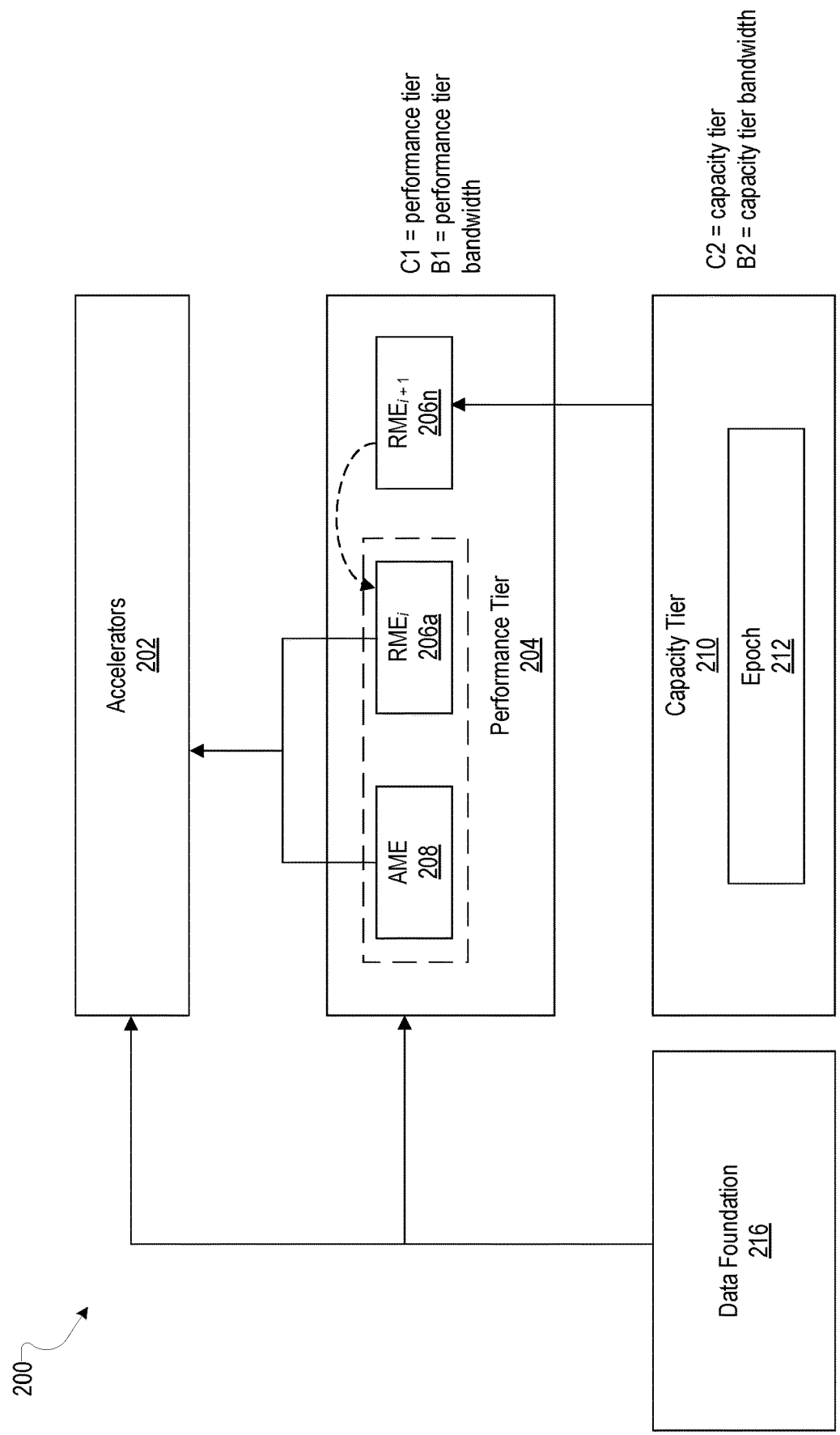
FIG. 2 is a block diagram of an exemplary multiple-tier storage system, according to implementations of the present disclosure.

FIG. 2 is a block diagram 200 of an exemplary architecture of a multiple-tier storage system, according to implementations of the present disclosure. The block diagram 200 illustrates one or more accelerators 202, a performance tier 204, and a capacity tier 210. The performance tier 204 can comprise at least one or more storage components (e.g., memory) that provides a quicker read throughput, as compared to the capacity tier 210, but generally has less capacity than one or more storage components of the capacity tier 210. Conversely, the capacity tier 210 can comprise at least one storage components (e.g., memory) that provides a slower read throughput but generally has greater capacity than the one or more storage components of the performance tier 204. Some example storage components of the performance tier 204 can include SSDs, local nvme SSDs, or the like. Some example storage components of the capacity tier 210 can include parallel file systems, cloud storages, or the like. In some implementations, the performance tier 204 and/or the capacity tier 210 can be provided as storage service(s) on a cloud and can be accessed by the one or more accelerators 202 over a network.

The block diagram 200 denotes a capacity of the performance tier 204 C1 and its bandwidth B1. Further, the block diagram 200 denotes a capacity tier of the capacity tier 210 C2 and its bandwidth B2. Some plausible values for the B1, B2, C1, and C2 are:

C1=7.4 petabytes;
C2=250 petabytes;
C1/C2 storage capacity ratio=0.03;
B1=26.1 terabytes/second;
B2=2.5 terabytes/second; and
B1/B2 read throughput ratio=10.4.

As the example C1/C2 ratio suggests, the capacity tier 210 can provide storage capacity that is orders of magnitude greater than storage capacity of the performance tier 204. The capacity tier 210 can store a dataset used for ML training (e.g., training). The dataset can be maintained by the capacity tier 210, for example, by indexing data points comprised in the dataset. For example, each data point may be assigned an index in the form of a number 0 through m, where m represents the number of data points in the dataset. In some implementations, the data stored in the capacity tier 210 can be the entire dataset or a subset of the entire dataset made available for the training.

Metadata for the dataset is stored and managed in a data foundation repository 216. The data foundation repository 216 can comprise data store(s) for storing data and libraries of functions executed by the accelerators 202. In some implementations, the data foundation repository 216 may be provided as storage service(s) on a cloud and can be accessed by the one or more accelerators 202 over a network. The metadata may hold data valuations (or values) assigned to each data point of the dataset. For example, the metadata may comprise a table comprising a value assigned to each datum referenced according to the index number assigned to the data point. Additionally, the metadata may include proxies of any previously trained ML models, if any. In an example implementation, the metadata for the dataset comprises path-dependent data valuations that includes the values assigned to data points and the proxies (if any). More details on how data valuations and proxies are determined are provided in relation to the data valuation functions module 306 and path-dependent data valuation module 305 of FIG. 3.

Tables 1 through 3 below illustrate examples of proxies that are generated during training tasks (or jobs) that illustrate the path-dependent data valuations. The tables include entries for each ML training task (or job) along with a ML model identifier (e.g., a hash of the model name) and a validation vector for the ML model identifier. In generating the example proxies, a validation data set consisting of four data samples was used, such that each model can be approximated with the validation vector. For example, at prior to a first run $(t_0)$, the model proxy vector is set to empty and Proxy$(t_0)$ is null. Then, when a first training task finishes $(t_1)$, the model proxy is set to Proxy$(t_1)$ and updated to include Table 1 below.

TABLE 1

| Task ID | Model ID | Validation Vector |
|---|---|---|
| job$_1$_id | hash(model$_1$_name), | [False, False, True, False] |

When a second training task is completed $(t_2)$, the model proxy is updated to Proxy$(t_2)$ and set as shown in Table 2 below.

TABLE 2

| Task ID | Model ID | Validation Vector |
|---|---|---|
| job$_1$_id | hash(model$_1$_name), | [False, False, True, False] |
| job$_2$_id | hash(model$_2$_name), | [False, False, True, False] |

The model proxy is updated for each training task. For example, when the $N^{th}$ training task is completed $(t_N)$, the latest validation results vector is appended to the model proxy, which is updated to Proxy$(t_N)$ and set as shown in Table 3 below.

TABLE 3

| Task ID | Model ID | Validation Vector |
|---|---|---|
| job$_1$_id | hash(model$_1$_name), | [False, False, True, False] |
| job$_2$_id | hash(model$_2$_name), | [False, False, True, False] |
| . . . | . . . | . . . |
| job$_N$_id | hash(model$_N$_name), | [False, False, True, False] |

A ML training task can process the dataset multiple times (e.g., the ML task makes multiple full passes of the dataset). Each such full pass of the dataset is referred to as an epoch 212. Thus, the epoch 212 can have a size of the dataset stored in the capacity tier 210. The ML training task can involve multiple epoch-iterations over the dataset.

For each epoch-iteration, the epoch 212 (or data thereof) can be split into multiple first type of mini-epochs 206a-206n (collectively referred to herein as mini-epochs 206). While only two of the first type of mini-epochs are shown in FIG. 2, such is for illustrative purposes only. The epoch 212 can be split into any number of mini-epochs. For example, the epoch 212 can be split into i number of mini-epochs 206, where i is an integer. Each mini-epoch 206 may include a subset of the data points of the epoch 212, for example, $1/i^{th}$ of data points of the epoch 212. The data points included in each mini-epoch 206 may be random, pseudo-random, sequential (e.g., each $1/i^{th}$ of data points of the epoch 212 according to assigned index number), etc.

Additionally, a second type of mini-epoch 208 may also be provided that is based on the path-dependent data valuations stored in the data foundation repository 216. For example, a number (h) of data points having the highest values assigned thereto, as stored in the metadata, are included in the second type of mini-epoch 208. The number of data points included in mini-epoch 208 may be any number as desired. For example, the number of data points in mini-epoch 208 may be equal to, less than, or greater than the number in each mini-epoch 206. In some implementations, it may be desirable to provide the second type of mini-epoch 208 having a similar, if not the same number, of data points as the first type of mini-epoch 206.

As used herein, the first type of mini-epoch 206 will be referred to as a random mini-epoch (RME) (also referred to as a regular mini-epoch) and the second type of mini-epoch 208 will be referred to as an accuracy mini-epoch (AME) (also referred to as an auxiliary mini-epoch). Data in each RME 206 is combined with data in AME 208 to provide a pool of data points, which can be processed over multiple iterations (e.g., up to a "repeating factor" further described below) before moving to the next RME 206. The next RME 206 is then combined with the AME 208 and processed over multiple iterations. The ML training task can involve multiple mini-epoch-iterations over the same pool of data points of a given combination of RME 206 and AME 208.

For each mini-epoch-iteration, the combination of RME 206 and AME 208 (or the data thereof) can be split into multiple batches. Data in each batch can be processed together by the one or more accelerators 202 before moving to the next batch for a next batch-iteration. For example, data points of the combined RME 206 and AME 208 are sampled to obtain a batch of data points to be processed during a given batch-iteration. Thus, each batch includes one or more data points of RME 206 and one or more data points of AME 208. The sampling of RME 206 and AME 208 may be performed using a weighted sampler that samples the pool of data points according to a first weight assigned to RME 206 and a second weight assigned to AME 208. The value of each weight assigned may be based on desired randomness to be introduced in the ML training task. If more randomness in the training is desired, then the weight assigned to the RME 206 is increased and/or the weight assigned to the AME 208 is decreased. The weighted sampler then samples the pool of data points accordingly to provide a batch of data points.

As an example, an epoch can be the entire dataset which contains 1,000,000 data points (e.g., training data). In an illustrative example, each datum may be an image for training the ML model. A RME 206 can contain 50,000 data points or images, if the epoch is split into 20 mini-epochs. The AME 208 may contain 50,000 data points associated with the highest data valuations from the path-dependent data valuations, in a case where the number of data points in the AME 208 is the same as the number of data points in the RME 206. Thus, the pool of data points includes 100,000 data points. A batch can be a subset of the data points of the combined RME 206 and AME 208, which may include 1,000 images. At each batch-iteration, a new batch of data points can be fetched by sampling the combined pool of data points. If a different batch is selected for each batch-iteration of the ML training task, it would take 100 iterations to complete an RME and AME combination.

The example block diagram 200 illustrates three mini-epochs (e.g., first $RME_i$ 206a, a AME 208, and second $RME_{i+1}$) stored in the performance tier 204. A total number of mini-epochs can depend on various factors including C1/C2 storage capacity ratio and/or read throughputs B1, B2. Generally, each mini-epoch has a size equal to or less than one-third of the performance tier 204 storage capacity C1 (e.g., ≤0.33*C1). The mini-epoch size requirement is to ensure that at least three mini-epochs can be completely loaded into the performance tier 204 at one time.

By splitting of an epoch 212 into mini-epochs 206, during the training with a RME (e.g., the mini-epoch; 206a in combination with AME 208), the next RME (e.g., $RME_{i+1}$/206n) can be prefetched from the capacity tier 210 into the performance tier 204. Since the mini-epoch size requirement specifies that each mini-epoch to be of equal or less than one-third the size of the performance tier 204, each of the RME 206a, AME 208, and next RME 206n can be loaded in the performance tier 204 simultaneously. So long as the accelerators 202 are training a ML model with the RME 206a and AME 208, the next RME 206n can be prefetched without causing I/O bottleneck stalls. Data in the next RME 206n can be readied for use by the accelerators 202 when the accelerators 202 are done training the ML model with the RME 206a. More details on how the splitting an epoch into multiple mini-epochs are provided in relation to the mini-epoch loading module 304 of FIG. 3.

In some implementations, the mini-epochs can have overlapping data. For example, data points included in the AME 208 may overlap with data points a given RME 206. Additionally, data points in one RME 206 may overlap with another RME 206. For such mini-epochs, each mini-epoch could have a size that is greater than the one-third of the performance tier 204. Again, the mini-epoch size requirement is to ensure that at least three mini-epochs can be completely loaded into the performance tier 204 at one time, overlapping or otherwise.

To reduce/avoid the I/O bottleneck and to fully utilize data of the combined RME 206 and AME 208 for model convergence, the one or more accelerators 202 can perform/execute multiple mini-epoch iterations of the same ML task on the data while the next RME 206 is prefetched. For example, the accelerators 202 may iterate over the RME 206 and AME 208 a j "repeating factor" number of times. A higher repeating factor can reduce I/O bandwidth demand by increasing training duration for the RME 206a and AME 208 and reducing immediate need for the next RME 206n. Thus, the higher repeating factor can free up I/O bandwidth demand for other nodes and applications that share the same storage (e.g., the performance tier 204 or the capacity tier 210).

The repeating factor can be selected based on desired I/O reduction for the multi-tier storage. Assume that the accelerators 202 can read data from the performance tier 204 at an effective bandwidth of EB1 and the performance tier 204 can read data from the capacity tier 210 at a bandwidth of B2. If the repeating factor is set to EB1 divided by B2 (e.g., EB1/B2) or greater, stalls caused by I/O bandwidth can be fully eliminated. In other words, for a repeating factor at or above EB1/B2, the accelerators 202 can train a ML model reusing data of the RME 206 and AME 208 while prefetching of the next RME 206.

Furthermore, to maintain accurate model convergence as the repeating factor is increased (or the number of RMEs 206 is increased), the one or more accelerators 202 can perform/execute multiple mini-epoch iterations of the same ML task on an RME 206 that is combined with high value data points of the AME 208. For example, the accelerators 202 may iterate over batches of data resulting from sampling the AME 208 and current RME 206. Inclusion of high value data points in each batch ensures that data determined to be useful, from prior ML training tasks, for a current training ML model is included in a current iteration. High value data forces the model convergence and improves model accuracy by reducing randomness, bias, and overfit to low value data. As noted above, the sampling may be based on a weighted sampler, whereby weights assigned to the RME 206 and AME 208 may be based on a desired randomness in the ML training task.

For example, the use of the repeating factor can be achieved with use of existing APIs (e.g., Tensorflow Dataset "repeat" API). While Tensorflow API is provided as an example, other ML frameworks including Pytorch and Cognitive Tookit (CNTK) can provide similar APIs that can be utilized to minimally modify existing ML applications for the same purpose.

Figures 3, 4:
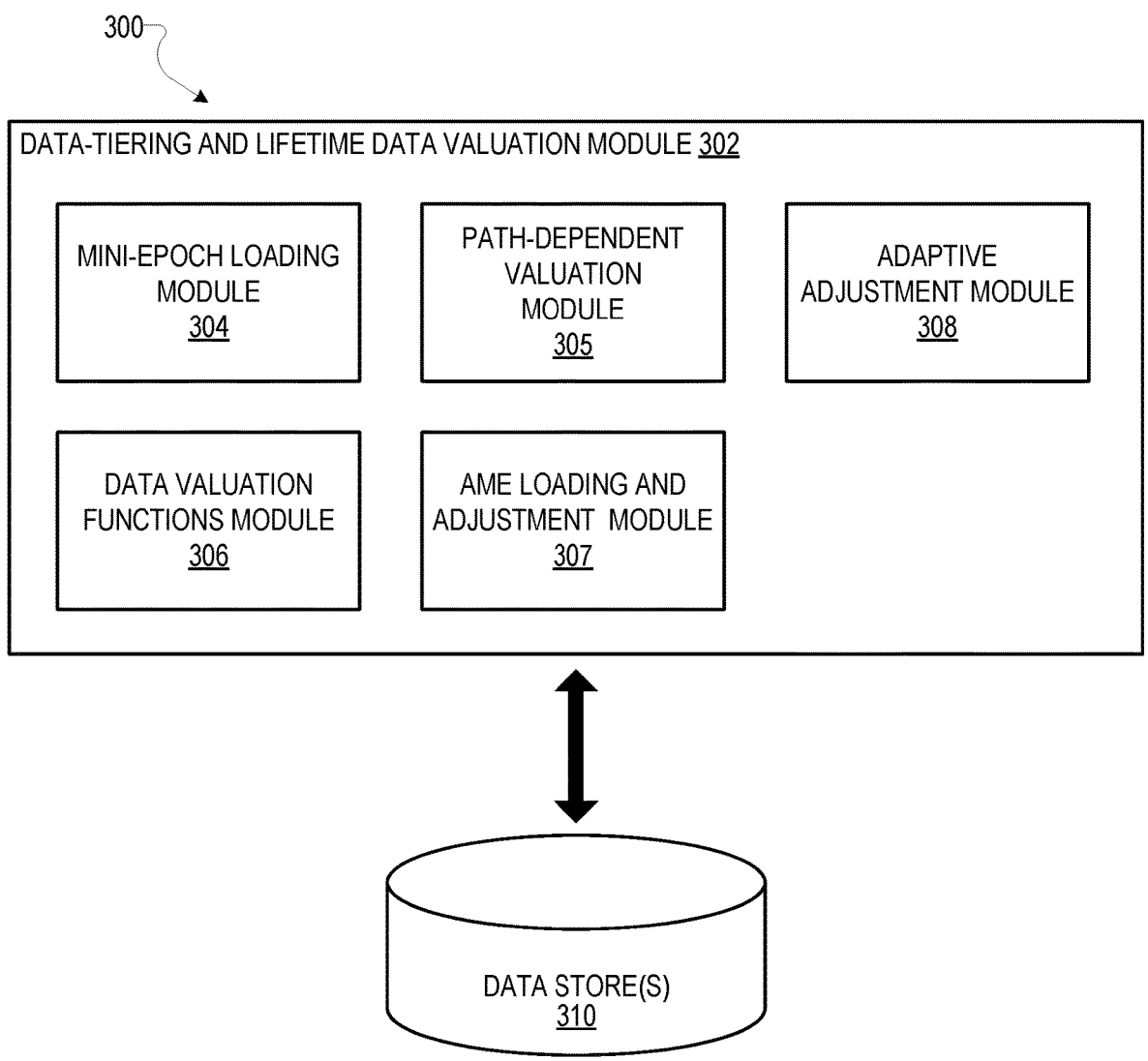
FIG. 3 is a block diagram of an example data-tiering and lifetime data valuation module, according to implementations of the present disclosure.
FIG. 4 is an example AME table according to implementations of the present disclosure.

FIG. 3 is a block diagram 300 of an example data-tiering and lifetime data valuation module 302, according to implementations of the present disclosure. The data-tiering and lifetime data valuation module 302 may be included in data foundation repository 216 and can include a mini-epoch loading module 304, a path-dependent data valuation module 305, a data valuation functions module 306, and an AME loading and adjustment module 307.

The data-tiering and lifetime data valuation module 302 can provide various functions relating to reducing stalls caused by I/O bandwidth without sacrificing model convergence and model accuracy. As one function, the data-tiering and lifetime data valuation module 302 can split an epoch into multiple RMEs and prefetch the next RME while training a ML model with an RME. As another function, the data-tiering and lifetime data valuation module 302 can call various functions for calculating data valuations and assigning values to data points. In some implementations, data valuation functions are organized into libraries of computation resources called and executed during a ML training task to calculate valuations for batches of data and map the valuations to individual data points. The data-tiering and lifetime data valuation module 302 can also write data valuations mapped to individual data points to metadata, stored in data store(s) 310, once a ML training task is completed. The data valuation functions module 302 can also contain validation functions in the form of libraries of computing resources for determining a proxy of a ML training task, which can be appended to the data valuations written to the metadata for providing path-dependent data valuations. As yet another function, the data-tiering and lifetime data valuation module 302 initializes data valuations by retrieving the path-dependent data valuations from the data store(s) 310, and identifies and groups together a number h of data points having the highest data valuations as an AME. The data-tiering and lifetime data valuation module 302 can adaptively adjust the datapoints included AME during a ML training task by replacing datapoints of the AME having the lowest data valuations assigned thereto with higher valued data points from a training batch. The modules in this figure and all figures herein are exemplary only, and other implementations may include additional, fewer, integrated or different components. Some modules may not be shown so as not to obscure relevant details.

In some implementations, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a network computing device or on a server. For example, one or more modules and/or applications described herein, or at least a portion thereof, can be implemented as or within an application (e.g., app), a program, or an applet, etc., running on network computing device or system. The network computing device or system can be one or more hubs, repeaters, bridges, switches, routers, gateways, or the like. In another example, one or more modules and/or applications, or at least a portion thereof, can be implemented using one or more computing devices or systems that include one or more servers, such as network servers or cloud servers. It should be understood that there can be many variations or other possibilities.

As shown in FIG. 3, the data-tiering and lifetime data valuation module 302 can be configured to communicate with data store(s) 310. The data store(s) 310 can be configured to store and maintain various types of data and function libraries to support the functionality of the data-tiering and lifetime data valuation module 302. For example, the data store(s) 310 can store and maintain various performance metrics including training loss, training accuracy, validation accuracy, a score that combines one or more performance metrics, model convergence feedback, various states, repeating factor, prefetching rate, size(s) of RME(s), or the like. Further, optimal strategy/policy/configurations can be stored and maintained by the data store(s) 310. Additionally, metadata including path-dependent data valuations, for example data valuations assigned to datapoints and proxies of previous ML training tasks, are stored and maintained in the data store(s) 310. The data store(s) 310 can also maintain a AME table of datapoints included in the AME, and example of which is described below with reference to FIG. 4. Accordingly, the data store 310 can support various functionalities of the mini-epoch loading module 304, data valuation functions module 306, path-dependent data valuation module 305, AME loading and adjustment module 307, and adaptive adjustment module 308.

The data valuation functions module 306 can be configured to execute computation resources stored in the data store(s) 310. For example, as noted above, the data store(s) 310 stores various functions organized in a library of computation resources. The accelerators 202 may execute a call function for a respective function that causes the data valuation functions module 306 to retrieve each respective function from the library and executes each respective function. The data valuation functions module 306 may then provide results of the respective function to the accelerators 202 for use in the current ML training task.

For example, the accelerators 202 may call for execution of a data valuation function. Various data valuation functions are stored in the data store(s) 310, each of which data valuation functions module 306 may execute to determine data valuations for data points responsive to a call from the accelerators 202. For example, the use of the data valuation functions can be achieved with use of existing APIs (such as, but not limited to, Uncertainty Based Methods that select samples in descending order of scores, data shapely functions, and influence functions). While the preceding APIs are provided as examples, other ML frameworks, such as CORDS providing a collection of approaches, can offer similar APIs that can be utilized to minimally modify existing ML applications for the same purpose.

The accelerators 202 may also call for execution of a mapping function, which maps (or assigns) valuations (e.g., from data valuation functions) to data points responsive to a call from the accelerators 202. For example, in an illustrative implementation during a batch-iteration, a value function may be executed on a batch to calculate a batch valuation.

The mapping function may then be executed that maps the batch valuation to each of the individual data points. The mapped valuations can be used for updating data valuations of the path-dependent data valuations assigned to each data point. In some implementations, a step size may be applied to the mapped data valuations in the form of a multiplier. The step size may be based on a similarity between the ML model of a current training task and ML models of previous ML training tasks. The similarity between ML models can be determined based on determining a similarity between a proxy representative of the current ML model and proxies of previous ML models, as will be described below in greater detail. Where the similarity is high, the step size may be set to a smaller number because the data valuations were well established during prior, similar training tasks and need not be adjusted to a large degree. Conversely, where similarity is low, the step sized is set to a larger number.

The AME loading and adjustment module 307 can be configured to generate and maintain an AME with data points assigned to high data valuations. For example, the AME loading and adjustment module 307 obtains the path-dependent data valuations from 310 and identifies a number (h) of data points from the dataset (e.g., the entire epoch) having the highest data valuations assigned thereto. The AME loading and adjustment module 307 then populates the AME table with information on the identified data points. For example, for each identified data point, the AME loading and adjustment module 307 populates an entry in the AME table with an index number of the respective data point and a location for the respective data point in the capacity tier 210 (e.g., a file path, URL, or other information facilitating locating the datapoint). The AME loading and adjustment module 307 then stores the AME table in the data store(s) 310.

The AME loading and adjustment module 307 can also be configured to dynamically update the AME by replacing low valued data points in the AME with higher valued data points identified during a current ML training task. For example, the AME loading and adjustment module 307 maintains a list of a subset of the data points in the AME that are assigned the lowest data valuations within the context of the AME. For example, AME loading and adjustment module 307 maintains a k-element list (where k is a number of data points) of lowest valued data points (also referred to as a bottom_k list) from the h-element list of the AME (e.g., k is less than h). In an example implementation, the number of k data points in the k-element list may be similar, if not equal to, the number of data points in a batch. During a ML training task, data valuations for training data points are determined, for example, by referencing the data valuation functions in data valuation functions module 306. If a batch valuation of the of a given batch is above an upper threshold value, the data valuations assigned to each data point of the batch during the ML training task are compared with data valuations assigned to each data point of the k-element list. If a data valuation assigned to a data point of the batch is higher than that of a data point in the k-element list, the data point of the k-element list is replaced with the data point from the batch. For example, the AME table is updated by replacing an entry for low valued data points in the k-element list with information for the higher valued data point from the batch. In this way, the AME loading and adjustment module 307 dynamically updates the data points in AME to ensure highest valued data points are maintained in the AME across a current ML training task.

The mini-epoch loading module 304 can be configured to split an epoch into multiple RMEs, fetch a current RME and AME from the capacity tier into the performance tier, and prefetch the next RME while training a ML model progresses with a current RME and the AME. The splitting of an epoch into RMEs and use of a repeating factor can be added to existing ML applications with minimal code change. For example, the splitting can be achieved with use of existing APIs (e.g., Tensorflow Dataset "split" API). There are many alternative ways to implement the mini-epochs including using Tensorflow Dataset "window" API.

In some cases, sizes of mini-epochs may not be uniform. In those cases, other APIs including Tensorflow Dataset "take" API and "skip" API may be used to modify existing ML applications with few lines of additional code. While Tensorflow API is provided as an example, other ML frameworks including Pytorch and Cognitive Tookit (CNTK) provide similar APIs that can be utilized to minimally modify existing ML applications for the same purpose. For example, "obtain", "initialize", and "update" API may be used to obtain, create, and update the data in the AME. The mini-epoch loading module 304 can track sizes of each mini-epoch.

In some implementations, the mini-epoch loading module 304 can monitor training progress using a RME and an AME and/or prefetching progress of the next RME. The monitored process can be used by the mini-epoch loading module 304 to instruct the data-tiering and lifetime data valuation module 302 when to start using the next RME for training. For example, one or more pointers can indicate the AME and which RME to use in training, and (1) when a repeating factor described in relation to FIG. 2 is reached and (2) when the next RME has been fully loaded, modify the one or more pointers to direct the data-tiering and lifetime data valuation module 302 to use the next RME for further training.

While the splitting an epoch into multiple RMEs and adding repeated factor for a RME can eliminate I/O bandwidth bottlenecks as discussed above, the repeated use of the RME in training can introduce some convergence concerns. First, data in a particular RME is likely to have more bias than data in the entire epoch. Thus, repeated use of the RME may introduce some bias in a trained ML model. Further, the repeated use can overfit a trained ML model to the RME, which can lead to reduce accuracy in the trained ML Model. The disclosed technology can address these issues with by training the ML model using the AME in conjunction with the RME. For example, bias in a given RME and overfit can be reduced through training on both the random data of the RME and the high valued data of the AME.

Furthermore, the disclosed technology can provide lifetime data valuations for the dataset through path-dependent data valuations. The path-dependent data valuation module 305 can be configured to store path-dependent data valuations to the data store(s) 310, for example, by maintaining and updating data valuations in the metadata of the dataset. For example, during a ML training task, data valuations are performed on batches of data points, which can be used to update data values assigned to each data point, as described above. During the ML training task, the data valuations are updated by the path-dependent data valuation module 305 (e.g., in a cache) according to step size that is based on a similarity between the current ML model and ML models previously trained using the dataset. The data valuations are performed and updated during periodically at each $N^{th}$ batch-iteration, to reduce computation resource overhead. Once the ML training task is completed (e.g., all epoch-iterations over the dataset are completed), updated data valuations for the dataset are written the metadata stored in the data store(s) 310. The data valuations evolve over all prior ML training tasks and can be used for a subsequent ML training task by providing high valued data for an AME, which can reduce bias and overfit due to randomized RMEs.

Furthermore, the path-dependent data valuation module 305 can be configured to maintain the path-dependent data valuations by tracking validation accuracy of the dataset across prior ML training tasks. For example, the path-dependent data valuation module 305 can create a proxy for each ML model trained on the dataset. The proxies can be appended to the path-dependent data valuations for use during a subsequent ML training. In some implementations, a proxy for a current ML training is determined periodically at each $N^{th}$ batch-iteration and cached in the path-dependent data valuation module 305. Once the ML training task is completed, the final updated proxy for the current ML training task is written to the path-dependent data valuations.

Proxies may be provided in the form of validation accuracy of ML models trained on the dataset. For example, validation accuracy of previously trained ML models can be compared with a validation accuracy of a current ML model trained on the dataset during a current training task. Based on the comparison, if the validation accuracy for current ML model is similar to a validation accuracy of one or more prior trained ML models, then the data valuations can be updated using to a step size that is lower. That is, an inverse relationship is provided between the similarity between ML models and the step size (e.g., as similarity increase, step size decreases).

In an illustrative example, path-dependent data valuation module 305 may create a proxy during a current ML training task by executing a validation accuracy function on a validation dataset. The validation dataset can include a number of data points used for only validation. The validation accuracy function may be a model inference performed on the validation dataset, and the results are held by path-dependent data valuation module 305 as a vector of binary values (referred to herein as a validation vector). In an illustrative example, the model inference may be performed as a classification problem, whereby the ML model predicts a classification for each data point of the validation dataset, which are compared to known labels. If classifications are correct, then a binary value in the vector is set to "True", whereas if incorrect the value is set to "False". In another example, the binary values may be set to "1" for True or "0" for False, or vice versa. The size of the validation vector is equal to the number of data points in the validation dataset. For example, if there are four data points, the validation vector will be a 4-bit wide vector, where each bit corresponds to the accuracy of a prediction by the ML model on the corresponding data point. An example validation vector may be [True, True, True, False] where the ML model predicted the first three data points correctly but failed on the last data point. From the validation vector, a validation accuracy can be calculated, for example, 75% in the above example.

The path-dependent data valuation module 305 determines a similarity of the current training task to prior trained ML models based on comparing the validation vectors. In an illustrative example, a covariance function (executed by data valuation functions module 306) is performed that calculates the covariance of the validation vector of the current ML training task to that of a prior trained ML model. The covariance is a measure of relationship (e.g., distance) between the validation vector of the current ML training task to each prior trained ML models.

The adaptive adjustment module 308 can be configured to adaptively adjust the frequency at which that the data valuations are updated and/or the frequency data points in the AME are replaced (also referred to as swapped out) during a ML training task. In some implementations, an optimal strategy can be identified during the training based on the effective bandwidth of EB1 (e.g., effective bandwidth that the accelerators 202 can read data from the performance tier) and the bandwidth B2 (e.g., bandwidth that the performance tier 204 can read data from the capacity tier 210). For example, an optimal strategy can be identified avoids I/O fetch stalls resulting from high frequency of swapping data points in the AME. The frequency of swapping data points out of the AME can be monitored and maintained such that the bandwidth of the capacity tier 210 will be sufficient to facilitate replacing of AME data points. For example, an optimal strategy can be determined by maintaining the following condition:

$$\frac{1}{N} * P * X\% < \frac{B2}{EB1} \qquad \text{Eq. 1}$$

Where N is representative of the frequency at which data valuations are updated (e.g., path-dependent data valuation module 305 performs and updates at each Nt h batch-iteration); X is representative of the average percentage of data points in a given batch replaces data points in the AME; and P is representative of a probability of a batch valuation exceeding the upper threshold value, thereby enabling replacing data points in the AME with those from the batch in a case that data valuations of the batch data points are higher than those of k-element list of the AME. High N, P, and/or X values are indicative of a demand on I/O bandwidth. The frequency of actually swapping out data points in the AME is provided by (1/N)*P*X %, and, if this product exceeds the condition of Eq. 1, I/O fetch stalls may occur. Thus, an optimal strategy selects the values of N to ensure that the condition of Eq. 1 is maintained during a ML training task, which ensures that stalls caused by I/O bandwidth can be avoided. In other words, when the conditions of Eq. 1 are maintained, the accelerators 202 can train a ML model reusing data of the RME 206 and AME 208 while prefetching of the next RME 206. The optimal strategy can be maintained by 308 by monitoring the parameters of Eq. 1 and stored in a data store 310 and used for subsequent training runs that use a given dataset and model.

It should be noted that the terms "optimize," "optimal" and the like as used herein can be used to mean making or achieving performance as effective or perfect as possible. However, as one of ordinary skill in the art will recognize, perfection cannot always be achieved. Accordingly, these terms can also encompass making or achieving performance as good or effective as possible or practical under the given circumstances, making or achieving performance better than that which can be achieved with other settings or parameters, or making or achieving performance within acceptable bounds with an optimized strategy. In the context of the present disclosure an optimal strategy can refer to a set of parameters that provide the shortest training completion time. However, other implementations contemplated by the disclosed technology can be optimized in accordance with one or more other and/or alternative metrics criteria and not limited to just the shortest training completion time. For example, resource cost (e.g., cost to compute) may be another metric or criterion upon which to perform optimization. The degree of optimization can also be varied in accordance with user needs/desires.

FIG. 4 is an example AME table according to implementations of the present disclosure. The AME table 400 may be generated and updated, for example, by the AME loading and adjustment module 307 and stored in the data store(s) 310 of FIG. 3.

The AME table 400 may comprise a listing of all data points included in the AME as described above. The table 400 comprises a plurality of entries 402a-n, each populated with information corresponding to a data point of the AME. Information for each data points includes, but is not limited to, an index number 404 of each data point, a location (e.g., file path) 406 of where each data point is stored in the capacity tier, a bottom_k list status indicator 408 indicative of whether or not the corresponding data point is included in the k-element list, and a performance tier status indicator 410 indicative of whether or not the corresponding data point is currently cached in the performance tier. The index number 404 corresponds to the index number of the data point within the dataset, such that the data point can be accurately tracked and maintained across the epoch, RMEs, AME, etc.

As explained above, while the RME is replaced in the performance tier at a block level (e.g., next RME replaces entire current RME), data points of the AME may be replaced at an individual data point level based on a data valuation of a data point in a currently batch-iteration. Whenever a data point in the AME is replaced with a data point from a batch, the entry of the replaced data point will be removed and an entry will be populated with the information for the replacing data point. In an example, the entry of the replaced data point may be updated with the information for the replacing data point. In another example, the entry of the replaced data point may be deleted from the table 400 and a new entry created and populated for the replacing data point.

Additionally, upon initially replacing a data point in the AME table 400 with a new data point from the batch, the status indicator 410 is first set to "false" (or No) as a default. The data point is then pre-fetched and loaded into the performance tier for inclusion with the AME. Once loaded into the performance tier, the status indicator 410 is toggled to "true" (or Yes). However, due to I/O bandwidth restraints of the capacity tier, updating the AME in the performance tier may take time, and in rare cases the accelerators may seek to use a data point that is not yet loaded into the performance tier (e.g., in a queue or not yet started to fetch). Thus, to avoided I/O fetch stalls while updating the AME, Retrieval of data points in the AME may be achieved with use of customization of existing APIs, for example, a customized "get_item" function in Pytorch and Cognitive Tookit dataset class. The customized function may execute the customized "get_item" function by first executing a get function in the performance tier to attempt to retrieve the data point. If the data point is loaded into the performance tier, the get_item function reads the data point from the performance tier in the same manner as data of the RME. However, if the data point is not yet loaded into the performance tier, the "get_item" function obtains the data point directly from the capacity tier using the location information 406 of the table. In this way, the accelerators need not wait for the update to be completed in the performance tier in the rare case that a data point of the AME is not yet loaded into the performance tier.

Figure 5:
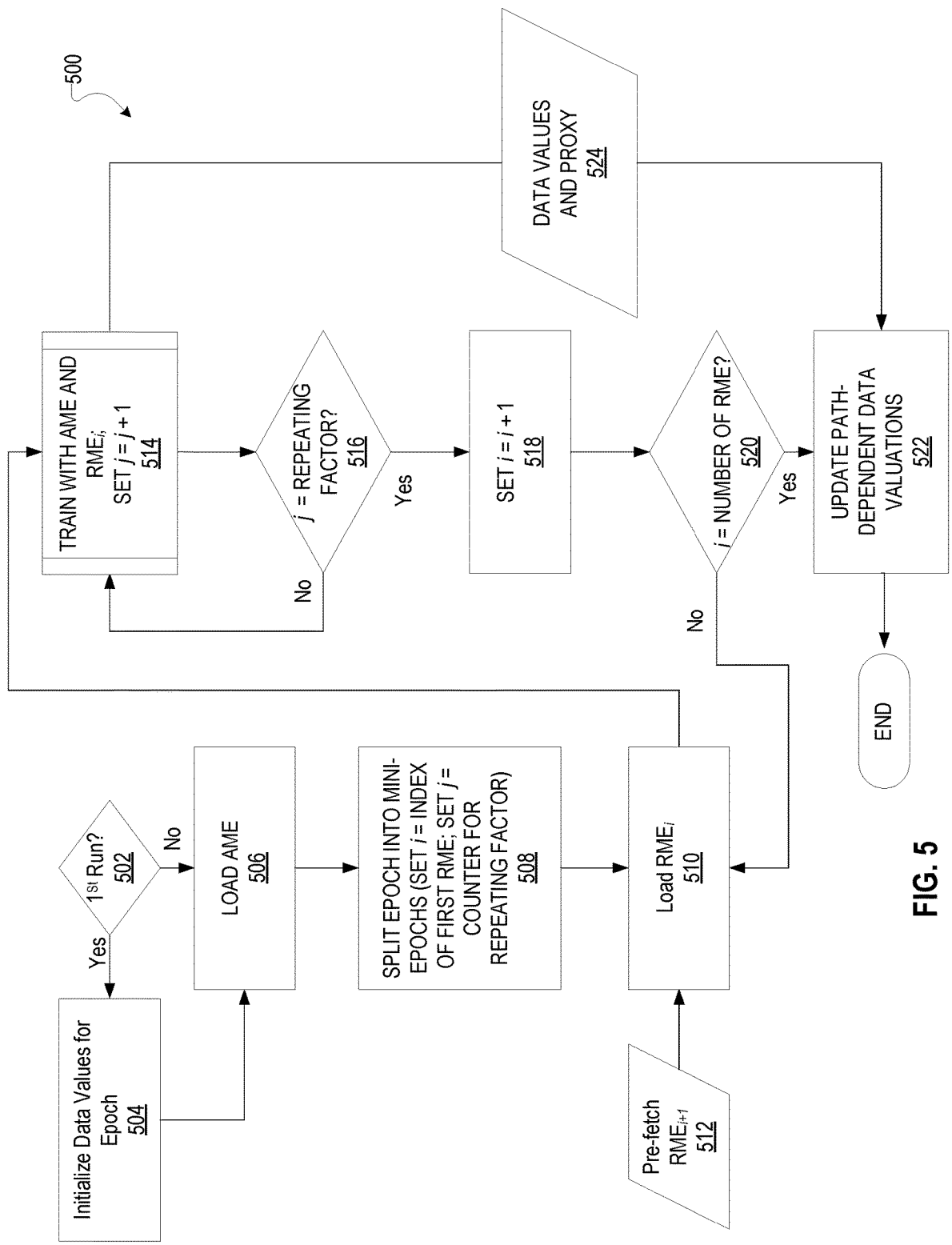
FIGS. 5-6B are flowcharts illustrating an example process of operation of the multiple-tier storage system of FIG. 2, according to implementations of the present disclosure.
Figure 6A:
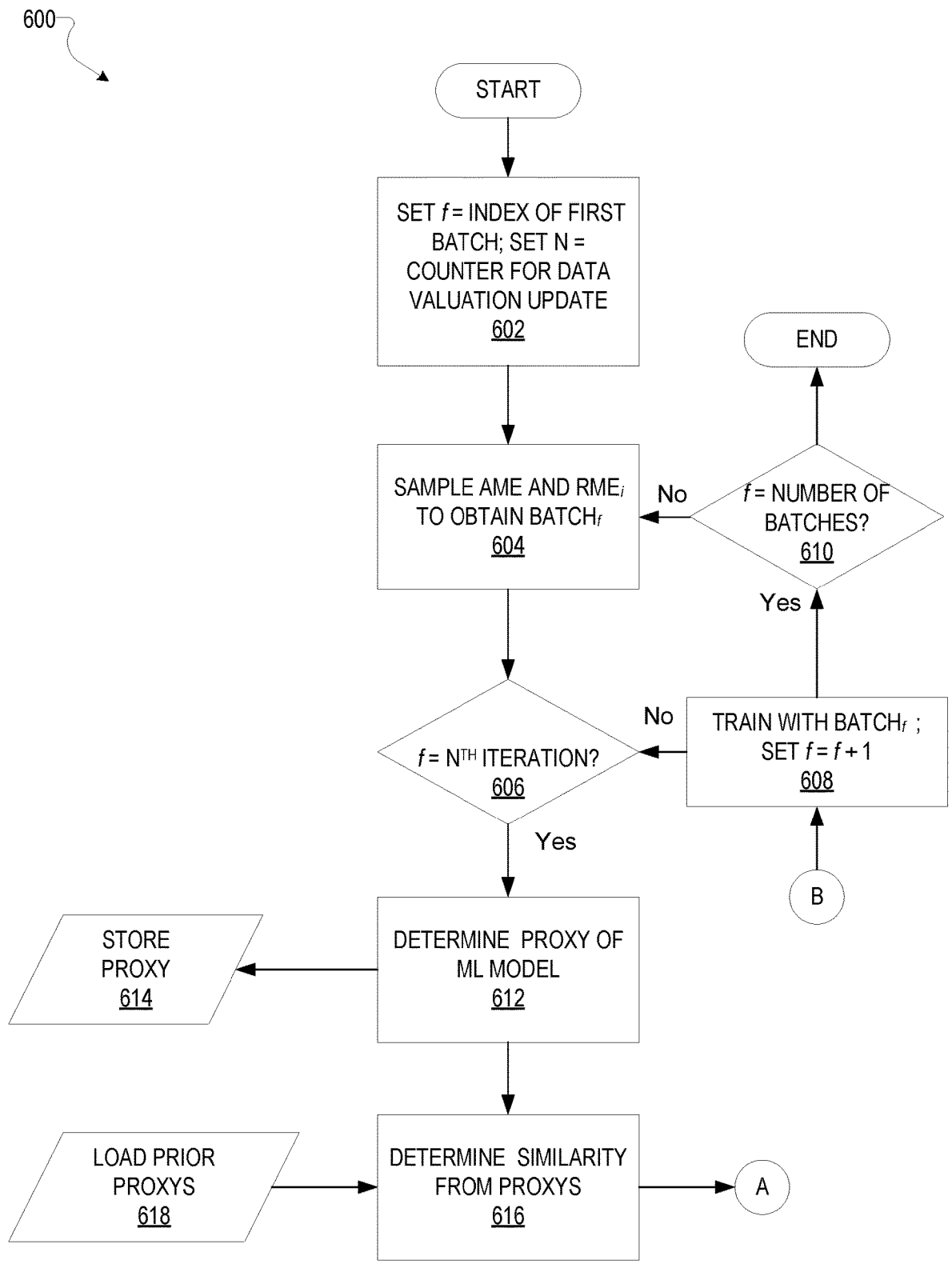
Figure 6B:
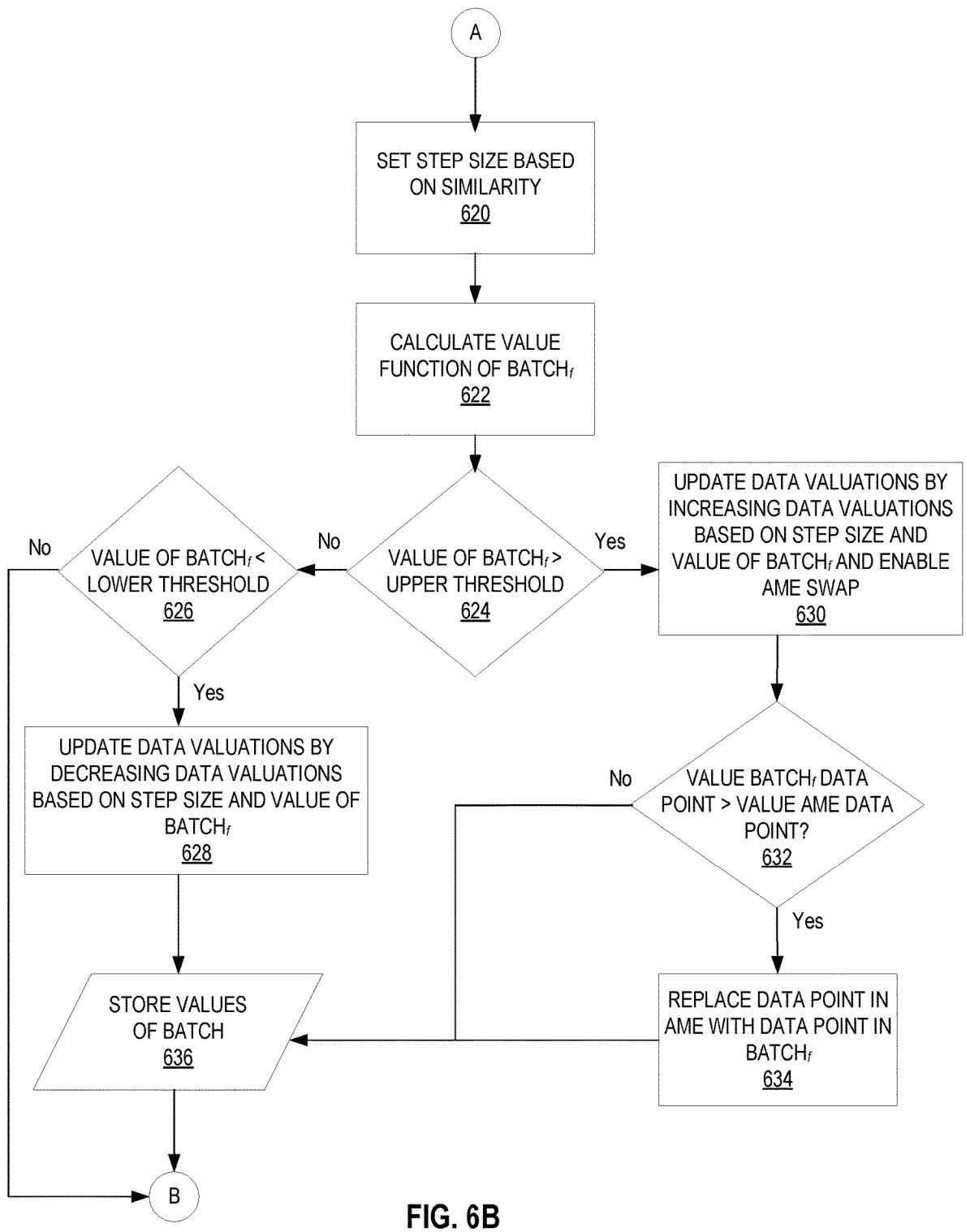

FIGS. 5-6B are flowcharts illustrating an example process of operation of the multiple-tier storage system 200 of FIG. 2, according to implementations of the present disclosure. FIG. 5 illustrates an example process 500 performed by the data-tiering and lifetime data valuation module 302 of FIG. 3, and FIGS. 6A and 6B illustrate an example sub-process 600 that can be performed as part of process 500. Process 500 is an example of a ML training task performed by the multiple-tier storage system 200 of FIG. 2.

At block 502, process 500 determines if the dataset has been used in any prior ML training tasks. For example, the metadata associated with the data set is accessed from the data foundation repository 216 and checked whether path-dependent data valuations are included in the metadata. As illustrative example, the determination at block 502 may comprise checking whether data valuations are assigned to the data points, which would be indicative of a prior ML training task. Also, either alone or in combination, the presence of a proxy of a prior trained ML model included in the metadata can also be indicative of a prior ML training task. If path-dependent data valuations are not present (e.g., indicative of a first run), the determination at block 502 is "No" and process 500 proceeds to block 506.

If path-dependent data valuations are present, the determination at block 502 is "Yes" and data values are initialized at block 504 by assigning an initial value to each data point of the epoch. In some implementations, the initial value may be a randomized or pseudo-random value assigned to each data point (e.g., using a random number generator). In another example, the initial values for each data point may be set to the same value, thereby indicating an equal value at startup. Any approach of initializing the initial values may be implemented at block 504. The data values are stored in the data foundation repository 216 and the process 500 proceeds to block 506.

At block 506 (e.g., either after a determination of "No" at block 502 or after initializing the values of the epoch at block 504) the process 500 loads an AME into the performance tier 204 as discussed in relation to FIGS. 2 and 3 above. For example, at block 504 the data foundation repository 216 retrieves path-dependent data valuations, identifies, and groups together a number h of data points having the highest data valuations to generate the AME. Data valuations may be retrieved from the data foundation repository 216, such as from path-dependent data valuations written to metadata. Alternatively, in the case of the first run through of the data set, the data values initialized at block 504 are used to create the AME. If data values for multiple points under consideration of inclusion in the AME are equal, a random selection method is applied to select an appropriate number of the data samples. Additionally, at block 506 the AME list is generated (e.g., AME list 400), which is stored in the data foundation repository 216 for subsequent reference and adjustment. The data points of the AME are then fetched from epoch of the capacity tier (e.g., capacity tier 210), for example, by referencing the AME table to locate data points and loaded into the performance tier (e.g., performance tier 204).

At block 508, an epoch can be split into RMEs as discussed in relation to FIGS. 2 and 3. Further, an index i, a counter for RMEs used in training, and an index j, a counter for the repeating factor of FIG. 2, can be provided. Initially, i can be set to an index of the first RME and j can be set to zero or one according to an indexing scheme used for the counter j.

At block 510, a RME associated with the counter for RME i (e.g., $RME_i$) can be loaded into the performance tier 204 of FIG. 2 for training. If the operation is performed for the first time in the training, the loaded RME can be the first RME. In some implementations, loading of the first RME may be performed in parallel to the loading of the AME.

At block 512, the next RME (e.g., $REM_{i+1}$) can be prefetched into the performance tier 204 of FIG. 2. In some implementations, the prefetching (and loading that follows) of the next RME can be performed in parallel to the loading of the $RME_i$ at N504.

At block 514, a current ML model can be trained with the AME and $RME_i$, for example, as described in relation to FIGS. 2 and 3 above. Block 514 may include updating data valuations for data points included in the $RME_i$ and AME. In some examples, block 514 may include determining a proxy in the form of a validation vector, as described in relation to FIGS. 2 and 3 above. In other examples, the proxy may be determined later in process 500, for example, after completing a training on RME; (e.g., after block 516 described below). In yet another example, the proxy may be determined at the end of each mini-epoch iteration (e.g., after block 514). The update data valuations and proxy may be stored to a temporary storage in the data foundation repository 216 (e.g., data store(s) 310 in some examples) at block 524. Additional details regarding the operations of block 514 are provided in relation to FIGS. 6A and 6B below. Further, the counter j for the repeating factor can be incremented when the training with the AME and $RME_i$ is complete or in progress.

At block 516, the counter j can be compared against the repeating factor to determine whether another training with the AME and $RME_i$ should be performed/executed. If the counter j has not yet reached the repeating factor, then the training can be repeated with the AME and $RME_i$ at block 514. Furthermore, as alluded to above in an example, after block 514 and before block 516, a proxy for the current ML model, a similarity to proxies of previously trained ML models, and a step size may be determined as described below in relation to blocks 612-620 of FIGS. 6A-6B. That is, for example, the proxy for the current ML model and step size for updating data valuations may be determined after a mini-epoch iteration at block 514.

At block 518, if the counter j for the repeating factor has reached the repeating factor at block 516, then the operations can proceed to block 518 to increment the counter i used to index the RMEs. Incrementing the counter i can cause the operations to load the next RME (e.g., $RME_{i+1}$) at 510 and prefetch a RME that follows the next RME (e.g., $RME_{i+2}$) at block 512. Furthermore, as alluded to above in an example, if the counter j for the repeating factor has reached the repeating factor at block 516, a proxy for the current ML model, a similarity to proxies of previously trained ML models, and a step size may be determined as described below in relation to blocks 612-620 of FIGS. 6A-6B. That is, for example, the proxy for the current ML model and step size for updating data valuations may be determined after training the ML model on RME; and AME.

At block 520, whether the counter i for indexing RMEs has reached a number of total RMEs can be determined. If the counter i has not yet reached the number of total RMEs, the operations can proceed to 510 as discussed. If the counter i has reached the number of total RMEs, then the operations can proceed to block 522.

At block 522, data valuations for data points in the epoch and the proxy for the ML model are written to metadata stored in the data foundation repository 216 as path-dependent data valuations. For example, in the case of a first run of the dataset, the data valuations and proxy are obtained from block 524 and written as initial entries into the metadata as path-dependent data valuations. Data values for each data point in the dataset are assigned from the data valuations and the proxy for the ML model, in the form of a validation vector, as described above in relation to FIGS. 2 and 3, is appended to the data valuations. In the case that the current ML training task is not the first run, the data valuations included in the metadata are updated with the data valuations determined during the current ML training task and the proxy is appended to the data valuations (and any preceding proxies) as an update to the path-dependent data valuations. Once written to the metadata, the process 500 ends.

Referring to FIGS. 6A and 6B, process 600 is an example sub-process that may be performed by the multiple-tier storage system 200 of FIG. 2 at block 514 of FIG. 5. Process 600 comprises example operations for updating data valuations and determining a proxy of a current ML model as described above in relation to FIGS. 2 and 3.

Process 600 starts, for example, at block 514 of FIG. 5. At block 602, an index f, a counter for batches used in training, and an index N, a counter for the data valuations updates can be provided. Initially, f can be set to an index of the first batch and N can be set to a number of batch-iterations for periodically updating data valuations of data points in the dataset. As described above in relation to FIG. 3, N may be set to ensure that condition of Eq. 1 is maintained, thereby avoiding I/O stalls.

At block 604, the AME and $RME_i$ are sampled to obtain a first batch of data points, as described above in relation to FIGS. 2 and 3. For example, the accelerators 202 may sample the AME and $RME_i$ in the performance tier 204 to obtain first batch (e.g., $batch_f$). In some examples, the AME and $RME_i$ are sampled according to a weighted sampler.

At block 606, the counter f can be compared against the data valuation updates counter N to determine whether updating of data valuations should be performed/executed on $batch_f$. If the counter f has not yet reached the counter, then the current ML model can be trained with the data points contained in $batch_f$ at block 608. Further, the counter f used to index the batches is incremented. At block 610, whether the counter f for indexing batches has reached a number of total batches can be determined. If the counter f has not yet reached the number of total batches, the operations can proceed to block 604 where a second batch ($batch_{f+1}$) is obtained by sampling the AME and $RME_i$. If the counter f has reached the number of total batches, then process 600 ends and proceeds to block 516 of FIG. 5.

If the counter f as reached the update counter (e.g., the $N^{th}$ batch-iteration), the process proceeds to block 612 where a proxy for the current ML model is determined in the form of a validation vector, as described in relation to FIGS. 2 and 3. The proxy may be determined using the current trained state of the ML model (e.g., mid-training) to calculate validation accuracy of the current ML model using a validation dataset, as described in relation to FIG. 3. The proxy of the current ML model can then be temporarily stored at block 614, for example, in the data foundation repository 216 of FIG. 2.

At block 616, the similarity between the current ML model and prior trained ML models is determined, as described in relation to FIGS. 2 and 3 above. For example, at block 618, proxies for prior trained ML models (if any) are obtained from path-dependent data valuations in the data foundation repository 216 (e.g., as written to the metadata). A similarity between the proxy of the current ML model and proxies of prior trained ML models are then determined. For example, similarity between proxies in the form of validation vectors, as described above in relation to FIGS. 2 and 3, can be determined by executing a covariance function on the validation vectors. From the covariance calculation, the similarity between the models can be determined.

At block 620, a data valuation update step size is set based on the similarity determined at block 616. For example, if the current ML model is highly correlated with one or more prior ML models according (e.g., highly similar), the step size is set to a small number. Alternatively, if there is low correlation between the current ML model and the prior ML models, then the step size is set to a larger number.

While FIGS. 6A and 6B depict blocks 612-620 as performed as part of process 600, as alluded to above, the operations of blocks 612-620 may be performed elsewhere within the process 500 of FIG. 5, and may be moved from the position shown in FIGS. 6A and 6B. For example, blocks 612-620 may be performed after block 514 and before block 516. As another example, blocks 612-620 may be performed after block 516, for example, before block 518 in case where the determination at block 516 is Yes or before block 514 in a case where the determination at block 516 is No. In yet another example, blocks 612-620 may be performed before block 514 in a case where index i has been incremented at least once.

At block 622, a valuation of the batch$_f$ is determined by executing a value function for batch$_f$. For example, a value function, as described above in relation to FIGS. 2 and 3, may be executed on batch f that returns a batch valuation. The batch valuation may be similar to a data valuation (e.g., a usefulness of the batch in training the ML model) that applies to the batch$_f$ as a block of data.

At block 624, the batch valuation for batch$_f$ is compared to an upper threshold value. The upper threshold value may be referred to herein as a first threshold, which may be set as desired for the particular training task. For example, if the batch valuation for batch$_f$ is normalized to [0,1], the upper threshold can be set to 0.75.

If the batch valuation for batch f is below or equal to the upper threshold value, the batch valuation for batch f is compared to a lower threshold value at block 626. The lower threshold value may be referred to herein as a second threshold, which may be set as desired for the particular training task. For example, if the batch valuation for batch$_f$ is normalized to [0,1], the lower threshold can be set to 0.25. If the batch$_f$ is above or equal to the lower threshold, the process 600 proceeds to block 608 and trains the current ML model on the data points contained in batch$_f$.

It the batch valuation of batch$_f$ is below the lower threshold, the data valuations of the data points are updated at block 628 by decreasing (e.g., negative or downward adjustment) the data valuations based on the step size and the batch valuation of batch$_f$. For example, the batch valuation can be mapped to each data point using a mapping function, as described above in relation to FIG. 3. The step size is applied to the mapping, for example, as a multiple, which can be used to increment the data valuations downward or negatively. The updated data valuations are then temporarily stored in the data foundation repository 216 at block 636. Thus, when the batch valuation of a given batch of data points is below the lower threshold (e.g., indicative that the batch is not useful for training the ML model), the lifetime data valuations (e.g., as contained in the path-dependent data valuations) can be incremented downward to reflect that the data points of the batch are less useful than previously indicated by the path-dependent data valuations.

If the batch valuation of batch$_f$ is above the upper threshold, the data valuations of the data points are updated at block 630 by increasing the data valuations based on the step size and the batch valuation of batch$_f$. For example, the batch valuation can be mapped to each data point using a mapping function, as described above in relation to FIG. 3. The step size is applied to the mapping, which is used to increment the data valuations upward or positively. The updated data valuations are then temporarily stored in the data foundation repository 216 at block 636. Thus, when the batch valuation of a given batch of data points is above the upper threshold (e.g., indicative that the batch is more useful for training the ML model), the lifetime data valuations (e.g., as contained in the path-dependent data valuations) can be incremented upward to reflect that the data points of the batch are more useful than previously indicated.

Additionally, at block 630, swapping of data points in the AME is enabled, which permits data points in the AME to be replaced with data points in batch$_f$. For example, a function executed by the data valuations functions module 306 of FIG. 3 may be set to True. Setting the function to true, enables the function to compare data valuations assigned the data points in batch (with data valuations assigned to data points in the AME to determine whether to replace one or more data points in the AME with one or more data points in batch$_f$. In some examples, the function for swapping data points in the AME may be disabled at block 628, for example, by setting the function to False.

An example of pseudo code for updating the data valuations is provided below. The pseudo code may be an illustration of an implementation of blocks 622-630.

---

Algorithm 1

```
for i, batch in enumerate (train_loader):
    ### traing the model
    ...
    if i % freq_cal_data_value == 0:
        ### calculate the value function for this batch
        batch_value = value_func (epoch, batch, target, loss)
        if (batch_value > upper_bound):
            for data in batch:
                score [data] += value_lr * b2d_f (batch_value)
            swap_data_ame = True
        else (batch_value < lower_bound):
            for data in batch:
                score [data] -= value_lr * b2d_f (batch_value)
            swap_data_ame = False
```

---

In the pseudo code, "value_func" represents the value function executed to determine the batch valuation (e.g., "batch_value) of a given "batch" of an "epoch" as a function a "target" parameter and "loss" parameter; "target" is the ground truth of the "batch" and "loss" is a loss function during training; "value_lr" represents the step size; "b2d_f" represents the mapping function; "score[data]" represents the update to data valuations of the data points; "swap_data_ame" represents setting the AME replacement functionality to be enabled or disabled.

At block 632, the data valuations assigned to data points in batch$_f$ are compared to data valuations assigned to data points in the AME on a data point by data point basis. Particularly, the data valuations assigned to data points in batch$_f$ are compared to data valuations assigned to data points in the k-element list of the AME (e.g., bottom_k list) on a data point by data point basis. If a data point in batch$_f$ is assigned a valuation that is greater than a valuation assigned to a data point in the bottom_k list, then, at block 634, the data point in the bottom_k list is replaced with the data point in batch$_f$, as described above in relation to FIGS. 2 and 3.

In an example implementation, the bottom_k list of the AME can be sorted from least valuable (e.g., lowest data valuation) to most valuable (e.g., highest data valuation). Then, a data point from batch$_f$ is compared to the first data point of the sorted bottom_k list. If the valuation assigned to the data point from batch f is greater than that of first data point of the sorted bottom_k list, the data point from the batch$_f$ replaces the data point form the bottom_k list. For example, the AME table 400 is updated as described above in relation to FIGS. 2-4. The process re-sorts the updated bottom_k list and repeats for the next data point of batch$_f$.

An example of pseudo code for swapping the data points in the AME is provided below. The pseudo code may be an illustration of an implementation of blocks 632 and 634.

---
Algorithm 2
---
```
# maintain a bottom-K list of the samples in AME
if swap_data_amp:
    least_valuable_data = bottom_k (AME)
    least_valuable_data.sort ( )
    for data in batch:
        if score[data] > least_valuable_data [-1]:
            least_valuable_data.pop (-1)
            least_valuable_data . append (data)
            least_valuable_data . sort ( )
```
---

The example process of FIGS. 5-6B is for illustrative purpose only and the operations can be performed in various orders and in various combinations.

Furthermore, during the process of FIGS. 5-6B, parameters related to the frequency at which data points in the AME are replaced with data points form the batch are monitored, as described in relation to FIG. 3. For example, the average percentage of data points in the AME that are replaced (e.g., X %) is tracked across the entire training and updated after each N$^{th}$ batch-iteration. Similarly, the probability of a batch$_f$ having a batch valuation that exceeds the upper threshold (e.g., P) is tracked across the entire training and updated after each N$^{th}$ batch-iteration. The parameters of N, X %, and P are then used to monitor the condition set forth in Eq. 1 to ensure that the condition is met, thereby avoiding I/O stalls. In a case where the condition is not met, the counter N can be adjusted so to ensure that condition is maintained.

Figure 7:
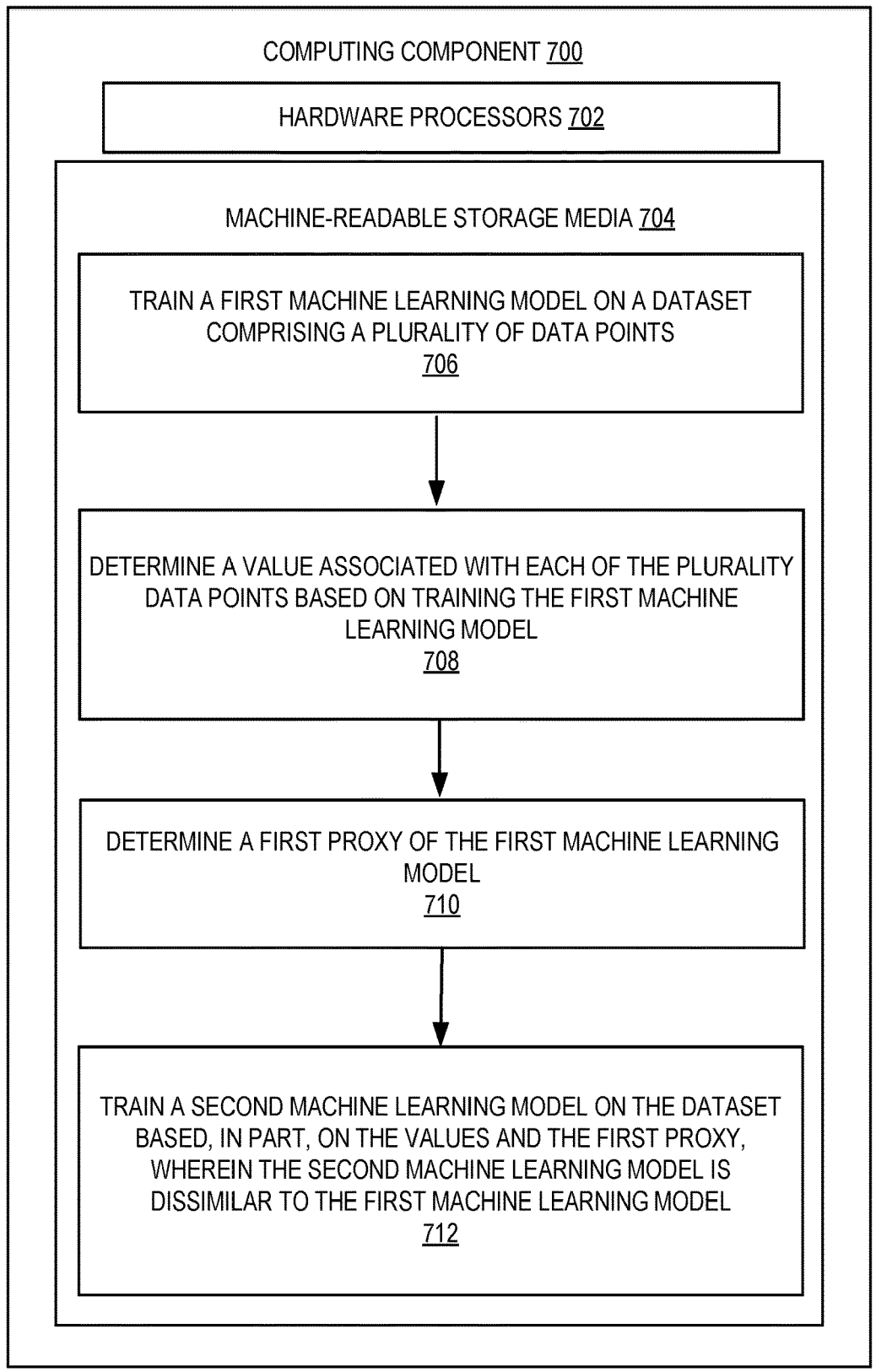
FIG. 7 depicts a set of executable instructions stored in machine-readable storage media that, when executed, cause one or more hardware processors to perform an illustrative method for reducing stalls caused by input/output (I/O) bandwidth without sacrificing model convergence or accuracy, according to implementations of the present disclosure.

FIG. 7 depicts a computing component 700 that includes one or more hardware processors 702 and machine-readable storage media 704 storing a set of machine-readable/machine-executable instructions that, when executed, cause the hardware processors 702 to perform an illustrative method for reducing stalls caused by IO bandwidth without sacrificing model convergence or accuracy. The computing component 700 may be, for example, the computing system 800 depicted in FIG. 8 or another computing device described herein. The hardware processors 702 may include, for example, the processor(s) 804 depicted in FIG. 8 or any other processing unit described herein. The machine-readable storage media 704 may include the main memory 806, the read-only memory (ROM) 808, the storage 810, or any other suitable machine-readable storage media described herein.

At block 706, in example implementations, instructions may be executed by the hardware processors 702 to train a first ML model on a dataset comprising a plurality of data points, for example, as described in relation to FIGS. 2-6.

At block 708, in example implementations, instructions may be executed by the hardware processors 702 to determine a value associated with each of the plurality data points based on training the first ML model, for example, as described in relation to FIGS. 2-6.

At block 710, in example implementations, instructions may be executed by the hardware processors 702 to determine a first proxy of the first ML model, for example, as described in relation to FIGS. 2-6.

At block 712, in example implementations, instructions may be executed by the hardware processors 702 to determine whether to train a second ML model on the dataset based, in part, on the values and the first proxy, for example, as described in relation to FIGS. 2-6. The second ML model is dissimilar to the first ML model.

Figure 8:
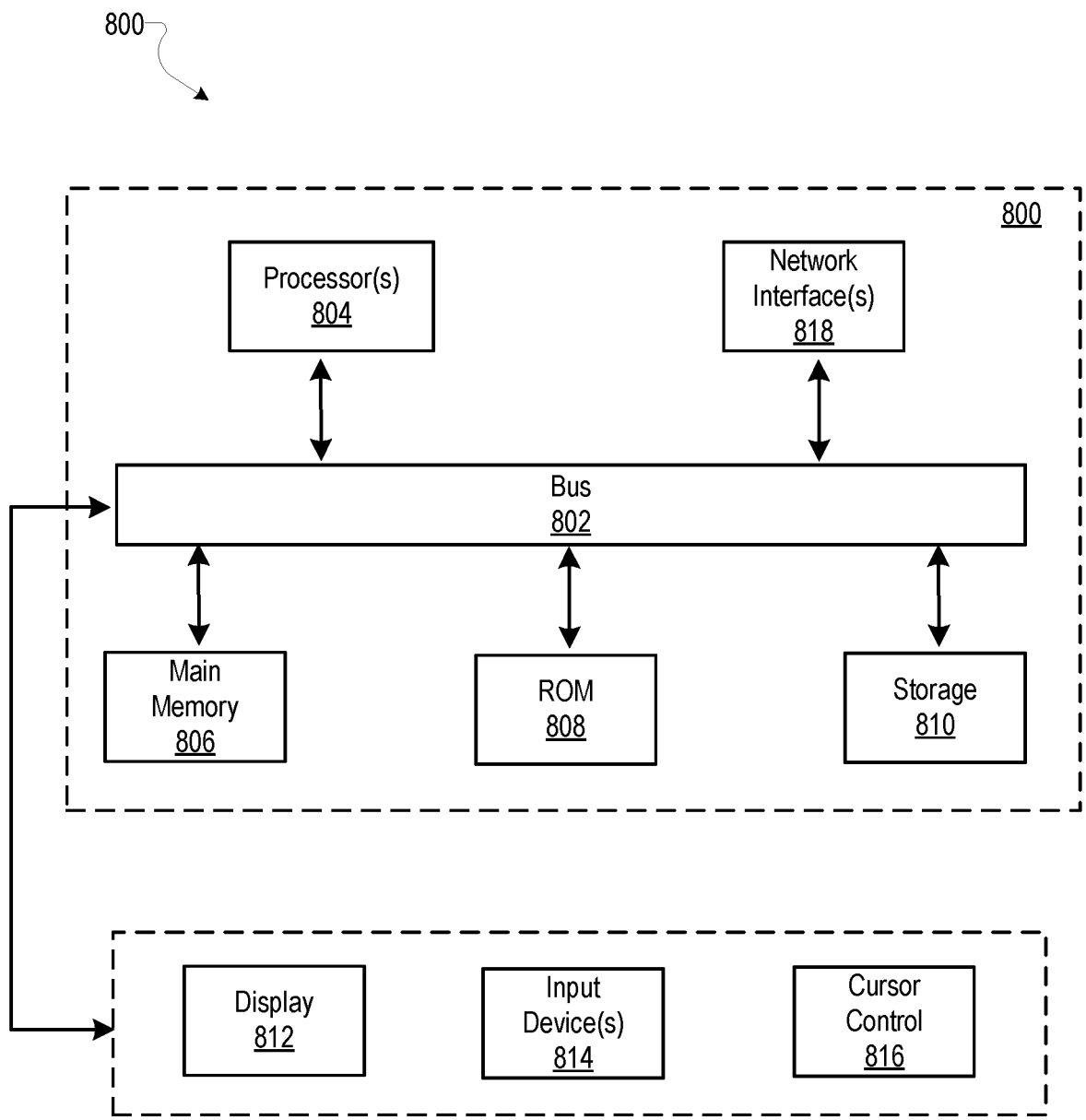
FIG. 8 is an example computing component that may be used to implement various features of implementations described in the present disclosure.

FIG. 8 8 depicts a block diagram of an example computer system 8 800 in which various of the implementations described herein may be implemented. For example, the computer system 800 may be implemented as the multiple-tier storage system 200 of FIG. 2 or a part thereof. As another example, the computer system 800 may be implemented to execute the processes 500 and 600 of FIGS. 5-6B. The computer system 8 800 includes a bus 8 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some implementations, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Any of the aforementioned engines or modules can be embodied as a computing component of the computing system 800. For example, the data-tiering and lifetime data valuation module 302, mini-epoch loading module 304, path-dependent data valuation module 305, the data valuation functions module 306, the AME loading and adjustment module 307, and/or adaptive adjustment module 308 of FIG. 3 can be embodied as a computing component of the computing system 800.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative implementations, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Some forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH memory, NVRAM, any other memory chip or cartridge, and networked versions of the same. The non-transitory media can also include any special-purpose circuits or circuits that can be configured for the special purpose, such as FPGAs and ASICs.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example implementations. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain implementations include, while other implementations do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

What is claimed is:

1. A method comprising:
   training, by a hardware processor, a first machine learning model on a dataset comprising a plurality of data points, wherein the dataset is stored in a capacity tier of memory;
   determining, by the hardware processor, a value associated with each of the plurality of data points based on training the first machine learning model;
   determining, by the hardware processor, a first proxy of the first machine learning model;
   splitting, by the hardware processor, an epoch associated with the dataset into a plurality of first type mini-epochs;
   iteratively training, by the hardware processor, a second machine learning model with each of the plurality of first type mini-epochs and based, in part, on the values and the first proxy, wherein the second machine learning model is a different machine learning model than the first machine learning model, and wherein the plurality of first type mini-epochs are iteratively stored to a performance tier of the memory; and
   prefetching a subsequent mini-epoch for a subsequent iteration of training from the capacity tier into a remaining portion of the performance tier unoccupied by a current mini-epoch of a current iteration of training.

2. The method of claim 1, further comprising:
   writing, by the hardware processor, the values to metadata of the dataset; and
   appending, by the hardware processor, the first proxy to the values in the metadata.

3. The method of claim 1, wherein the first proxy is a validation vector comprising validation accuracy for the first machine learning model on a validation dataset.

4. The method of claim 1, wherein the plurality of first type mini-epochs comprise sets of a first number of data points of the dataset, wherein the method further comprises:
   loading, by the hardware processor, a second type mini-epoch into the performance tier, the second type mini-epoch comprising a second number of data points based the first proxy; and
   training, by the hardware processor, the second machine learning model with a first mini-epoch of the plurality of first type mini-epochs and the second type mini-epoch, wherein the first mini-epoch and the second type mini-epoch are to be iterated during the training for a third number of times, wherein the second type mini-epoch is stored to the performance tier during the training.

5. The method of claim 4, further comprising:
   during the training of the second machine learning model with the first mini-epoch and the second type mini-epoch, prefetching a second mini-epoch of the plurality of first type mini-epochs from the capacity tier into the performance tier.

6. The method of claim 4, wherein the second number of data points comprises data points having highest values, with respect to the dataset, assigned thereto.

7. The method of claim 4, further comprising:
   during each iteration of the first mini-epoch and the second type mini-epoch, iteratively obtaining, by the hardware processor, a batch of data points by sampling data points of the first mini-epoch and the second type mini-epoch;
   for each N-th iteration of obtaining a batch,
      updating, by the hardware processor, the values associated with each of the data points of the obtained batch;
      determining a second proxy of the second machine learning model; and
      writing the updated values and the second proxy to metadata of the dataset.

27

8. The method of claim 7, further comprising:
updating, by the hardware processor, the second type mini-epoch based on the updated values and second proxy.

9. The method of claim 8, wherein updating the second type mini-epoch comprises:
determining, by the hardware processor, that a data point in the batch is assigned a value that is greater than a value assigned to a data point included in the second type mini-epoch; and
replacing, by the hardware processor, the data point included in the second type mini-epoch with the data point included in a batch responsive to the determination that a data point in the batch is assigned a value that is greater than a value assigned to a data point included in the second type mini-epoch.

10. The method of claim 1, wherein prefetching the subsequent mini-epoch enables execution of a number of iterations at the performance tier while the subsequent mini-epoch is prefetched such that input-output stalls are avoided or reduced while maintaining machine learning model convergence by reducing input-output bandwidth demand.

11. A non-transitory computer-readable storage medium including instructions that, when executed by at least one processor of a computing system, cause the computing system to perform a method comprising:
obtaining path-dependent data valuation of a dataset stored in a capacity tier of memory, the path-dependent data valuation based on training one or more machine learning models on the dataset;
splitting an epoch associated with the dataset into a plurality of first type mini-epochs;
iteratively training a current machine learning model on the plurality of first type mini-epochs and based, in part, on the path-dependent data valuations, wherein the current machine learning model is dissimilar to the one or more machine learning models, and wherein the plurality of first type mini-epochs are iteratively stored to a performance tier of the memory, wherein iteratively training the current machine learning model comprises:
prefetching a subsequent first type mini-epoch for a subsequent iteration of training from the capacity tier into a remaining portion of the performance tier unoccupied by a current first type mini-epoch of a current iteration of training; and
updating the path-dependent data valuations based on the training of the current machine learning model.

12. The non-transitory computer-readable storage medium of claim 11, wherein the path-dependent data valuation comprises:
data valuations assigned to each data point comprised in the dataset; and
one or more validation vectors representative of validation accuracy of the one or more machine learning models on a validation dataset.

13. The non-transitory computer-readable storage medium of claim 12, wherein the instructions cause the computing system to perform the method further comprising:
obtaining an second type mini-epoch comprising a number of data points in the dataset assigned highest data valuations; and
loading the second type mini-epoch into the performance tier,

28 wherein the current machine learning model is iteratively trained with the second type mini-epoch.

14. The non-transitory computer-readable storage medium of claim 11, wherein training the current machine learning model comprises:
determining similarity between the current machine learning model and the one or more machine learning models based on the path-dependent data valuation; and
updating data valuations assigned to data points of the dataset during the training, and
wherein the path-dependent data valuation is updated, after the training of the current machine learning model is completed, based on the data valuations assigned to data points during the training of the current machine learning model.

15. The non-transitory computer-readable storage medium of claim 11, wherein the instructions cause the computing system to perform the method further comprising:
accessing the performance tier of memory that is coupled with the at least one processor; and
accessing the capacity tier of memory that is coupled with the performance tier, wherein the performance tier has faster read throughput than the capacity tier.

16. A system comprising:
at least one processor; and
a memory storing instructions that, when executed by the at least one processor, cause the processor to perform a method comprising:
splitting a dataset into a plurality of random mini-epochs, each comprising a first number of data points of the dataset, wherein the dataset is stored to a capacity tier of the memory;
loading, into a performance tier of the memory, an accuracy mini-epoch comprising a second number of data points of the dataset based on lifetime data valuations, wherein the second number of data points comprises data points assigned highest lifetime data valuations of the dataset; and
iteratively training a machine learning model with each of the plurality of random mini-epochs and based on the accuracy mini-epoch a first number of times, and wherein the plurality of random mini-epochs are iteratively stored to a performance tier of the memory, wherein an iteration of the training comprises:
training the machine learning model with a first random mini-epoch of the plurality of random mini-epochs and the accuracy mini-epoch, wherein the first random mini-epoch and the accuracy mini-epoch are to be iterated during the training for a second number of times; and
during the training of the machine learning model with the first random mini-epoch, prefetching a second random mini-epoch of the plurality of random mini-epochs from the capacity tier into a remaining portion of the performance tier unoccupied by the first random mini-epoch,
wherein the lifetime data valuations are determined based on training one or more other machine learning models.

17. The system of claim 16, wherein the instructions cause the processor to perform the method further comprising:
after iterating the first random mini-epoch and the accuracy mini-epoch the second number of times, training the machine learning with the second random mini-epoch and the accuracy mini-epoch.

18. The system of claim 16, wherein the instructions cause the processor to perform the method further comprising:
   accessing the performance tier of memory that is coupled with the at least one processor; and
   accessing the capacity tier of memory that is coupled with the performance tier, wherein the performance tier has faster read throughput than the capacity tier,
   wherein the training the machine learning model with the first random mini-epoch and the accuracy mini-epoch comprises:
      loading the first random mini-epoch and the accuracy mini-epoch into the performance tier from the capacity tier.

19. The system of claim 16, wherein the lifetime data valuations comprises:
   data valuations assigned to each data point of the dataset based training the one or more other machine learning models; and
   one or more proxies representative of validation accuracy of the one or more machine learning models.

20. The system of claim 19, wherein the instructions cause the processor to perform the method further comprising:
   during each iteration of the first random mini-epoch and the accuracy mini-epoch, iteratively obtaining a batch of data points by sampling data points of the first random mini-epoch and the accuracy mini-epoch;
   for each N-th iteration of obtaining a batch,
      updating the data valuations assigned to data points of the obtained batch; and
      determining a proxy of the machine learning model; and
   updating the accuracy mini-epoch based on the updated data valuations and the proxy.

* * * * *